Patented Apr. 23, 1940

2,197,873

UNITED STATES PATENT OFFICE 2,197,873

TREATMENT OF HYDROCARBON OILS

Jacque C. Morrell and Wayne L. Benedict, Chicago, Ill., assignor to Universal Oil Products Company, Chicago, Ill., a corporation of Delaware No Drawing. Application December 31, 1937, Serial No. 182,918

2 Claims. (Cl. 196—30)

This invention relates particularly to the treatment of gasolines and naphthas which are "sour" to the doctor test to render them both sweet and of proper color and color stability so that they are saleable.

It is common experience that both straight run and cracked gasolines produced from sulfur-containing crude oils or charging stocks respectively require special treatment to eliminate objectionable constituents which may be of a colored, odorous, or gummy character. Sulfuric acid is the reagent generally employed for the treatment of these distillates but it is usually supplemented by other more selective treatments such as sweetening processes which are aimed principally at a conversion of the ill smelling mercaptans into the comparatively non-odorous dialkyl disulfides.

It is the object of all chemical treatments to remove sufficient quantities of the groups of impurities mentioned above until they are reduced to a point corresponding to a finished gasoline. The application of so-called "sweetening" agents may be practiced either before or after a distillation following acid treatment or they may be applied to distillates which have not received any acid treatment. These "sweetening" reagents act principally to transform the foul smelling mercaptans into the relatively odorless and stable dialkyl disulfides by chemical reactions involving oxidation with the removal of the mercaptan hydrogen and the condensation of the residual radicals.

The oldest and best known sweetening treatment involves the use of sodium plumbite solutions followed by the addition of sufficient amounts of sulfur to precipitate lead sulfide from the initially formed lead mercaptides and form the desired organic disulfides. Owing to the numerous operating difficulties attending the use of plumbite such as the tendency to emulsion formation and the danger of having to use an excess of sulfur to "break" the lead from solution, numerous other sweetening treatments have been proposed and some have attained commercial importance. The use of hypochlorites has been found applicable to certain distillates, principally those of a straight run character and a later development has involved the use of copper compounds and it is with improvements in this last named type of sweetening process that the present invention is concerned.

In one specific embodiment the present invention comprises the treatment of copper-sweetened hydrocarbon oils for the removal of color and undesirable dissolved constituents therefrom by percolating said hydrocarbon oils through beds of granular solid contact materials comprising generally mixed oxides and hydroxides of alkali and alkaline earth metals.

While the invention is thus broad to the use of various alkaline oxides in admixture, the preferred materials consist of the mixed oxides of calcium and sodium in the product known to the chemical industry as soda lime since this is by far the cheapest material included within the general class and at the same time is sufficiently effective in producing the desired final purification of the copper sweetened stocks. Soda lime is commonly made by igniting a wet mixture of caustic soda and quick lime until a certain amount of the original water content is driven off and a material is formed which has decidedly alkaline and hygroscopic properties. It is readily obtainable commercially in coarse granular form and can be used directly for accomplishing the object of the present invention.

Owing to the relatively small percentage of compounds involved in sweetening reactions, the course of copper-sweetening from the chemical standpoint is not entirely certain. In such sweetening processes a large number of copper compounds may be employed either in a dry state or in solution and while in some cases there may be actual removal of sulfur by combination with copper, there may in other cases be merely the formation of copper mercaptides or a true oxidizing action depending upon the character of the copper salt employed. It is therefore not possible to state exactly what reaction products are present in a copper-sweetened gasoline such as, for example, a cracked gasoline, to cause an increase in color in the treated product, but it has been quite generally observed that this increase in color occurs. There are some indications that it may be due in part to oxidized compounds depending upon the copper compounds employed and the conditions of treatment. However, it has been found that color and cloudiness in copper-sweetened gasolines may be reduced to a practical minimum by the percolation of the sweetened material through granular materials comprising the mixed oxides of alkali and alkaline earth metals such as the preferred soda lime mixtures already described.

Owing to the uncertainty as to the exact nature and amounts of the contaminating materials in copper sweetened distillates, it is difficult to state exactly the reactions which may be involved in the final treatments employing soda lime. There is probably an extensive adsorption of heavy materials which may include copper mercaptides and oxidation products produced by the action of the cupric salts and there may be some transposition of bases. Since sour stocks treated by the copper method vary widely in composition particularly in regard to their mercaptan content, the products of the copper sweetening reactions will vary correspondingly and consequently both the qualitative and quantitative effects of the alkaline oxides will vary in different cases.

The secondary treating reagents characteristic of the present invention are conveniently employed as filling material in vertical cylindrical treaters either alone or mixed with relatively inert spacing agents such as, for example, crushed silica or firebrick, fuller's earth, etc. Since the compressive strength of the particles of such materials as soda lime is somewhat limited, it may be advantageous to employ considerable percentages of such spacing agents, or in case the pure materials are used without inert fillers, best results may be obtained when employing sectionalized towers wherein the reactive agents are supported upon a succession of screens in layers of relatively small depth. The preferred secondary treating materials are relatively inexpensive and when spent are usually discarded without attempting to effect reactivation, although this may be practiced if desired.

The following examples are given to illustrate results obtainable in the use of the compounds characteristic of the invention in effecting purification of copper sweetened distillates. While the data are entirely representative, it is not intended that they shall impose undue limitations upon the invention's proper scope.

The following tabulation shows characteristic results obtained in the copper sweetening of various commercial gasolines produced both by straight-run distillation and by cracking when employing the reagents characteristic of the present invention. Copper sweetening was effected by passing the sour gasolines downwardly through granular material comprising copper sulfate pentahydrate ($CuSO_4.5H_2O$), ammonium chloride ($NH_4Cl$), and crushed firebrick, and in the table this is referred to as "Copper reagent." The induction period in the table refers to the time in minutes in the well-known oxygen bomb test before the sharp break in the pressure curve is observed.

| Stock | Primary treat | Secondary treat | Color, °Saybolt | | Induction period | |
|---|---|---|---|---|---|---|
| | | | Orig. | 6 days dark storage | No inhibitor | +.015% commercial inhibitor |
| Reformed gasoline | None | None | 2 | 2 | 95 | 455 |
| Do | Copper reagent | do | 0 | Red cast | 100 | 475 |
| Do | do | 1. {Soda lime | +2 | +2 | 65 | 135 |
| Do | do | {Soda lime+water wash | +2 | +2 | 90 | 420 |
| Do | do | 2. {Soda lime | +4 | +4 | 110 | 435 |
| Do | do | {Soda lime+water wash | +4 | +4 | 55 | 380 |
| | | | | | 65 | 420 |
| Gasoline from commercial cracking process | None | None | −12 | Yel. | 110 | 210 |
| Do | Copper reagent | None (water wash) | Red | Ppt. | 55 | 195 |
| Do | do | Soda lime+water wash | −16 | Yel. | 70 | 220 |
| Straight run gasoline, sample No. 1 | None | None | 23 | | | |
| Do | Copper reagent | do | 22 | | | |
| Do | do | Soda lime | 25 | | | |
| Straight run gasoline, sample No. 2 | None | None | 30 | 30 | | |
| Do | Copper reagent | do | 19 | | | |
| Do | do | Soda lime | 28 | | | |

The nature of the present invention and its novel and commercial utility are obvious from the preceding descriptive and numerical sections, although neither is intended to unduly limit its scope.

We claim as our invention:

1. A process for refining gasoline-like distillates containing mercaptans which comprises subjecting the distillate to the sweetening action of a copper salt, and thereafter percolating the distillate through a bed of granular solid material comprising mixed oxides of sodium and calcium to remove from the distillate objectionable reaction products of the copper sweetening.

2. A process for refining gasoline-like distillates containing mercaptans which comprises subjecting the distillate to the sweetening action of a copper salt, and thereafter percolating the distillate through a bed of granular solid material comprising soda lime to remove from the distillate objectionable reaction products of the copper sweetening.

JACQUE C. MORRELL.
WAYNE L. BENEDICT.